Nov. 3, 1936.                B. DICK                    2,059,729
                        SEALING CUP EXPANDER
                        Filed May 15, 1935
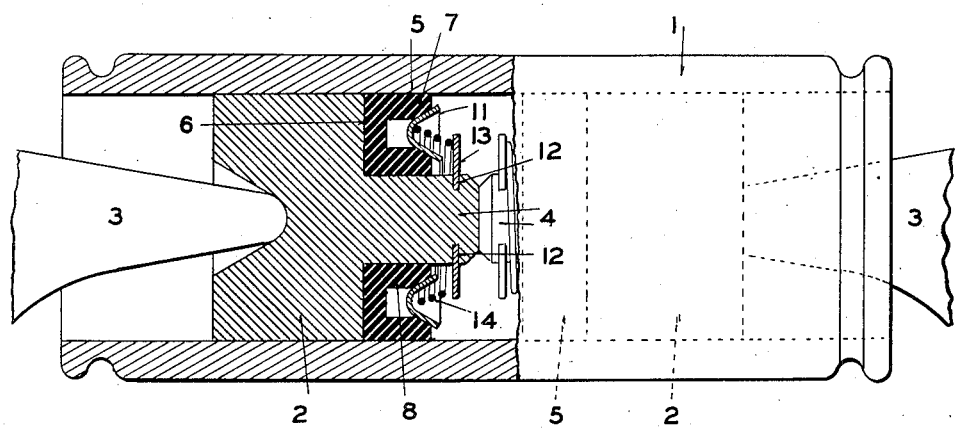
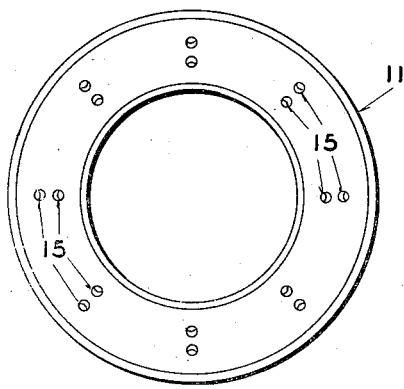
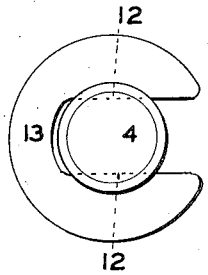
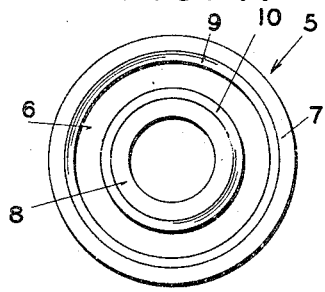
INVENTOR.
BURNS DICK
BY
ATTORNEY.

Patented Nov. 3, 1936

2,059,729

UNITED STATES PATENT OFFICE 2,059,729

SEALING CUP EXPANDER

Burns Dick, Ferguson, Mo., assignor to Wagner Electric Corporation, St. Louis, Mo., a corporation of Delaware Application May 15, 1935, Serial No. 21,588

2 Claims. (Cl. 309—37)

My invention relates to sealing cups and more particularly to expanding means for sealing cups of the annular type employed in piston and cylinder combinations.

One of the objects of my invention is to provide an annular sealing cup with single means for pressing the outer annular flange or lip of the cup against the cylinder wall and the inner annular flange or lip thereof against the surface of the piston projection upon which the cup is mounted.

Another object of my invention is to provide a piston head having a central projection with a sealing cup and sealing cup expanding means which is simple in construction, efficient in operation, and economical to manufacture.

Other objects of my invention will become apparent from the following description taken in connection with the accompanying drawing in which Figure 1 is a partial cross-sectional view of a brake actuating fluid motor showing my improved annular sealing cup and expanding means; Figure 2 is an enlarged view of the expanding ring member; Figure 3 is an end view of the piston projection and C-washer, and Figure 4 is an end view of the sealing cup.

Referring to the drawing in detail, I have selected a brake actuating motor of a hydraulic braking system to illustrate my invention but it is to be understood that it may be embodied in other piston and cylinder combinations if found desirable. The cylinder 1 is provided with a pair of oppositely movable pistons 2 for actuating the ends 3 of the brake shoes or brake band whereby the brakes may be applied when fluid under pressure is introduced into the portion of the cylinder between the pistons. The pistons 2 and my novel sealing cup and expanding means mounted upon each are of identical construction and, therefore, only one construction will be described in detail.

Each piston has integrally formed on its head a cylindrical projection 4 which is adapted to carry the annular sealing cup 5, which is made of suitable flexible material such as rubber, and comprises a body portion 6 surrounding the projection 4 and engaging the surface of the piston head. This body portion has an integral outer annular flange or lip 7 for engagement with the wall of the cylinder and an integral inner annular flange or lip 8 for engagement with the surface of the piston projection.

Annular sealing cups mounted upon piston projections have been proposed for use in fluid systems but they have not proved to be entirely satisfactory. Under prolonged use, especially in hydraulic brake systems, the inner and outer flanges tend to lose their resiliency and, therefore, fail to have sufficient pressure engagement with their adjacent surfaces to produce an efficient seal. This inefficient sealing may easily permit air to be drawn into the system during the return stroke of the piston which, of course, is very undesirable since an efficent hydraulic system must be free of any air. Also, it has been found that when the flanges 7 and 8 of the cup lose their resiliency, fluid will creep between the flanges and their adjacent surfaces when the piston is in inoperative position, and if at this time the system is subjected to low temperatures this fluid because of its low viscosity will tend to hold the flanges away from their surfaces thus causing a serious leakage of fluid from the system when the fluid is placed under pressure.

In accordance with my invention I have devised expander means for these annular flanges of the cup which is simple in construction and which will simultaneously maintain both flanges in pressure engagement with their adjacent surfaces, thereby increasing the efficiency of the braking system under all operating conditions and also prolonging the useful life of the sealing cup.

The flanges 7 and 8 are formed with beveled surfaces 9 and 10, respectively, which surfaces are in diverging relation. An annular expander ring member 11 of V-shaped cross-section is interposed between the flanges 7 and 8 so that the diverging surfaces of the ring member cooperate with the beveled surfaces 9 and 10 on the flanges. The arrangement is such that when the ring member is in engagement with the beveled surfaces, it will be spaced from the body or base portion of the sealing cup.

The outer end of the piston projection 4 has a pair of cross-cuts 12 into which is received the legs of a C-washer 13. An expansible coil spring 14 surrounds the piston projection 4 and is interposed between the expander ring 11 and the C-washer 13 to thereby bias the expander ring toward the base of the sealing cup, causing the flanges 7 and 8 to engage the cylinder wall and the surface of the projection 4 with a definite and pre-determined pressure. The expander ring is also provided with a plurality of perforations 15 to permit free communication of liquid from one side of the ring to the other whereby the fluid under pressure in the cylinder also may act on the walls of the flanges to assist in maintaining the flanges in sealing engagement with their adjacent surfaces.

By means of the construction just described, the flanges 7 and 8 will at all times be maintained in sealing engagement with their adjacent surfaces regardless of whether or not the fluid in the system is under pressure. Therefore, even if the flanges should lose some of their resiliency as a result of deterioration, they cannot assume a position where they are out of sealing engagement with their adjacent surfaces. Also, if the surface of flange 7 should become worn, as the result of its relative movement with respect to the cylinder wall, the spring 14 will continue to maintain the flange in sealing engagement with the piston wall.

The entire expanding device is simple in construction and requires only a very small space. It is also very easily assembled and disassembled since the C-washer may be quickly removed to permit the spring, the expander ring, and the sealing cup to be mounted upon or removed from the piston projection 4. The whole assembly is carried by the piston, thus permitting the spring to exert a uniform pressure upon the expander ring regardless of what position the piston may assume. This latter feature is a considerable improvement over the old type of expanders employed in double piston motors of the type disclosed wherein the expansible spring which is interposed between the cups on the pistons will exert a varying pressure as the pistons move toward and away from each other.

Having fully described my invention, what I claim as new and desire to secure by Letters Patent of the United States is:

1. In a piston and piston sealing structure for reciprocation in a fluid containing cylinder, a piston provided with a central projection extending forwardly from its face, a sealing element surrounding the piston projection and comprising a body portion engaging the piston face and an outer annular flange engaging the cylinder wall and an inner annular flange engaging the piston projection, an annular ring lying between the annular flanges of the sealing element and provided with diverging surfaces, one of which engages the outer flange and the other the inner flange of said sealing element, said ring being spaced from the body portion of the element, an abutment carried by the projection forwardly of the sealing element, and an expansible coil spring surrounding the projection and interposed between the annular ring and the abutment and biasing the ring toward the body of the sealing element.

2. In a piston and piston sealing structure for reciprocation in a fluid containing cylinder, a piston provided with a central cylindrical projection extending forwardly from its face, a sealing element surrounding the piston projection and comprising a body portion engaging the piston face and an outer annular flange egaging the cylinder wall and an inner annular flange engaging the piston projection, an annular ring lying between the annular flanges of the sealing element and provided with diverging surfaces, one of which engages the outer flange and the other the inner flange of said sealing element, said ring being spaced from the body portion of the sealing element and provided with a plurality of perforations permitting free communication of fluid from the forward side of the ring to the space between the ring and the body portion of the sealing element, a removable abutment carried by the piston projection forwardly of the sealing element, and an expansible coil spring surrounding the projection and having one of its ends engaging the base of the annular ring and the other end engaging the abutment on the projection, said spring, annular ring and sealing element being free to be assembled and disassembled from the piston projection upon removal of the abutment.

BURNS DICK.